US010135077B2

(12) United States Patent
Hirano et al.

(10) Patent No.: US 10,135,077 B2
(45) Date of Patent: Nov. 20, 2018

(54) CORROSION RESISTANT METAL BIPOLAR PLATE FOR A PEMFC INCLUDING A RADICAL SCAVENGER

(71) Applicant: Ford Global Technologies, LLC, Dearborn, MI (US)

(72) Inventors: Shinichi Hirano, West Bloomfield, MI (US); Mark Stephen Ricketts, Windsor (CA); Kerrie K. Gath, Pittsfield, MI (US); Jun Yang, Bloomfield Hills, MI (US); Chunchuan Xu, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 65 days.

(21) Appl. No.: 14/620,530

(22) Filed: Feb. 12, 2015

(65) Prior Publication Data
US 2016/0240865 A1    Aug. 18, 2016

(51) Int. Cl.
*H01M 8/0228* (2016.01)
*H01M 8/0206* (2016.01)
(Continued)

(52) U.S. Cl.
CPC ......... *H01M 8/0228* (2013.01); *H01M 8/021* (2013.01); *H01M 8/0206* (2013.01);
(Continued)

(58) Field of Classification Search
CPC .. H01M 8/0228; H01M 8/0206; H01M 8/021; H01M 8/0215; H01M 2250/20
See application file for complete search history.

(56) References Cited

U.S. PATENT DOCUMENTS 7,553,517 B1 * 6/2009 Jablonski ............... C23C 10/30
427/252
8,101,319 B2   1/2012 Mikhail et al.
(Continued)

FOREIGN PATENT DOCUMENTS

| CN | 101092688 A | 12/2007 | |
|---|---|---|---|
| WO | 2013124690 A1 | 8/2013 | |
| WO | WO-2013124690 A1 * | 8/2013 | ........... C23C 14/352 |

OTHER PUBLICATIONS

Baker, Andrew M., et al. "Nafion membranes reinforced with ceria-coated multiwall carbon nanotubes for improved mechanical and chemical durability in polymer electrolyte membrane fuel cells." The Journal of Physical Chemistry C 118.46 (2014): 26796-26802.*

(Continued)

*Primary Examiner* — Sarah A. Slifka
*Assistant Examiner* — Brian R Ohara
(74) *Attorney, Agent, or Firm* — James Dottavio; Brooks Kushman P.C.

(57) ABSTRACT

The present disclosure includes fuel cell bipolar plates and methods of forming a radical scavenging coating on a bipolar plate. The bipolar plates may include a steel substrate, a middle layer contacting the steel substrate and including a bulk material and a radical scavenging material, and a conductive layer contacting the middle layer. The radical scavenging material may include cerium, such as metallic cerium or a cerium oxide. The conductive layer may include a conductive carbon, such as a diamond-like carbon or coating (DLC). The radical scavenging material may comprise 0.1 wt % to 30 wt % of the middle layer. The middle layer may be deposited using PVD, and the radical scavenging material may be doped into the middle layer, for (Continued)

example, by co-sputtering it with the bulk material of the middle layer.

18 Claims, 1 Drawing Sheet

(51) Int. Cl.
    *H01M 8/021*      (2016.01)
    *H01M 8/0215*      (2016.01)
    *H01M 8/1018*      (2016.01)

(52) U.S. Cl.
    CPC .. *H01M 8/0215* (2013.01); *H01M 2008/1095* (2013.01); *H01M 2250/20* (2013.01); *Y02T 90/32* (2013.01)

(56) References Cited

U.S. PATENT DOCUMENTS

| | | | |
|---|---|---|---|
| 8,182,963 | B2 | 5/2012 | Abd Elhamid et al. |
| 8,232,026 | B2 | 7/2012 | Kumar et al. |
| 8,268,466 | B2 | 9/2012 | Takeuchi et al. |
| 8,592,098 | B2 | 11/2013 | Jeon et al. |
| 8,623,301 | B1* | 1/2014 | Deininger ............ H01M 8/1253 423/21.1 |
| 8,778,562 | B2 | 7/2014 | Balogh et al. |
| 8,778,566 | B2 | 7/2014 | Jeon et al. |
| 8,859,164 | B2 | 10/2014 | Shirvanian |
| 2003/0190515 | A1* | 10/2003 | Brady ...................... C22C 19/05 429/533 |
| 2004/0186201 | A1* | 9/2004 | Stoffer ...................... C09C 1/56 523/215 |
| 2006/0019142 | A1* | 1/2006 | Abd Elhamid ....... B32B 15/015 429/518 |
| 2006/0032525 | A1* | 2/2006 | Olsen ...................... H01L 35/22 136/203 |
| 2006/0194095 | A1* | 8/2006 | Vyas ................... H01M 8/0213 429/482 |
| 2007/0243452 | A1* | 10/2007 | Weidman ............ H01M 4/8817 429/483 |
| 2007/0287057 | A1 | 12/2007 | Elhamid et al. |
| 2008/0038625 | A1 | 2/2008 | Abd Elhamid et al. |
| 2008/0076004 | A1 | 3/2008 | Rodak et al. |
| 2008/0096078 | A1* | 4/2008 | Miyake ............... H01M 4/9075 429/483 |
| 2008/0199767 | A1 | 8/2008 | Sexton et al. |
| 2009/0130502 | A1* | 5/2009 | Liu ..................... H01M 4/9008 429/483 |
| 2009/0317686 | A1* | 12/2009 | Huston ............... H01M 8/0236 429/432 |
| 2010/0035123 | A1* | 2/2010 | Narayanan ................ C22C 5/04 429/483 |
| 2010/0330389 | A1 | 12/2010 | Liu |
| 2011/0033784 | A1 | 2/2011 | Ljungcrantz et al. |
| 2011/0165501 | A1 | 7/2011 | Maeda et al. |
| 2011/0229791 | A1* | 9/2011 | Kageyama .......... H01M 8/0228 429/469 |
| 2011/0287336 | A1 | 11/2011 | Himeno et al. |
| 2012/0141919 | A1* | 6/2012 | Lee ..................... H01M 4/8663 429/524 |
| 2012/0231374 | A1* | 9/2012 | Iseki ....................... C01B 31/02 429/518 |
| 2013/0183602 | A1* | 7/2013 | Benicewicz .......... H01M 8/103 429/465 |
| 2013/0230793 | A1 | 9/2013 | Wang |
| 2016/0233523 | A1* | 8/2016 | Koizumi ............. H01M 8/0213 |

OTHER PUBLICATIONS

Lavigne, O., et al. "Cerium insertion in 316L passive film: Effect on conductivity and corrosion resistance performances of metallic bipolar plates for PEM fuel cell application." Surface and Coatings Technology 205.7 (2010): 1870-1877.*

Lee, S. B., et al. "Improved corrosion resistance and interfacial contact resistance of 316L stainless-steel for proton exchange membrane fuel cell bipolar plates by chromizing surface treatment." Journal of Power Sources 187.2 (2009): 318-323.*

Yin, Bin, et al. "Sliding wear behavior of HVOF-sprayed Cr3C2—NiCr/CeO2 composite coatings at elevated temperature up to 800 C." Tribology letters 37.2 (2010): 463-475. (Year: 2010).*

Vernilli, Fernando, et al. "Corrosion behavior in graphite refractories impregnated with ZrO2 and CeO2 carrying solutions." ISIJ international 45.12 (2005): 1871-1877. (Year: 2005).*

U Yin, Bin, et al. "Sliding wear behavior of HVOF-sprayed Cr3C2—NiCr/CeO2 composite coatings at elevated temperature up to 800 C." Tribology letters 37.2 (2010): 463-475. (Year: 2010).*

* cited by examiner

US 10,135,077 B2

CORROSION RESISTANT METAL BIPOLAR PLATE FOR A PEMFC INCLUDING A RADICAL SCAVENGER

TECHNICAL FIELD

The present disclosure relates to corrosion resistant metal bipolar plates including a radical scavenger.

BACKGROUND

Fuel cells, for example, hydrogen fuel cells, are one possible alternative energy source for powering vehicles. In general, fuel cells include a negative electrode (anode), an electrolyte, and a positive electrode (cathode). In a proton exchange membrane fuel cell (PEMFC), the electrolyte is a solid, proton-conducting membrane that is electrically insulating but allows protons to pass through. Typically, the fuel source, such as hydrogen, is introduced at the anode using a bipolar or flow field plate where it reacts with a catalyst and splits into electrons and protons. The protons travel through the electrolyte to the cathode and the electrons pass through an external circuit and then to the cathode. At the cathode, oxygen in air introduced from another bipolar plate reacts with the electrons and the protons at another catalyst to form water. One or both of the catalysts are generally formed of a noble metal or a noble metal alloy, typically platinum or a platinum alloy.

The bipolar plates in the PEMFC have two primary functions. First, the bipolar plates feed reactant gases (e.g., hydrogen and air) to the membrane electrode assembly (MEA). Second, the bipolar plates collect current from the MEA. In order to collect current, the bipolar plates must be conductive or have a conductive coating. Typically, the bipolar plates are formed from a conductive carbon-based material, such as a carbon composite, which may be fabricated by a molding process.

SUMMARY

In at least one embodiment, a fuel cell bipolar plate is provided. The bipolar plate may include a steel substrate, a middle layer contacting the steel substrate and including a bulk material and a radical scavenging material comprising cerium, and a conductive layer contacting the middle layer.

In one embodiment, the cerium includes metallic cerium or a cerium oxide. The middle layer bulk material may include a carbide or a nitride of chromium or titanium. The conductive layer may comprise a conductive carbon, for example, diamond-like carbon (DLC), graphite, graphene, and/or carbon particles. In one embodiment, the radical scavenging material comprises 0.01 to 30 wt % of the middle layer. In another embodiment, the radical scavenging material comprises 0.1 to 15 wt % of the middle layer. The middle layer may have a thickness of 5 nm to 10 μm.

In at least one embodiment, a fuel cell bipolar plate is provided. The bipolar plate may include a steel substrate, a middle layer contacting the steel substrate and including a bulk material and a radical scavenging material that scavenges at least one of hydroxyl radicals and perhydroxyl radicals, and a conductive layer including a conductive carbon contacting the middle layer.

In one embodiment, the radical scavenging material includes cerium, for example, metallic cerium or a cerium oxide. The middle layer bulk material may include a carbide or a nitride of chromium or titanium. In one embodiment, the conductive carbon includes one or more of a diamond-like carbon (DLC), graphite, graphene, and carbon particles. The radical scavenging material may comprise 0.1 to 15 wt % of the middle layer.

In at least one embodiment, a method of forming a radical scavenging coating on a fuel cell bipolar plate is provided. The method may include applying a middle layer to a steel substrate, the middle layer including a bulk material and a radical scavenging material including cerium, and applying a conductive layer to the middle layer.

In one embodiment, the cerium is deposited as metallic cerium or cerium oxide. The bulk material may include a carbide or a nitride of chromium or titanium. The conductive layer may comprise a conductive carbon. In one embodiment, applying the middle layer to the steel substrate includes applying the bulk material and the radical scavenging material such that the radical scavenging material comprises 0.01 to 30 wt % of the middle layer. Applying the middle layer to the steel substrate may include co-sputtering the bulk material and the radical scavenging material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
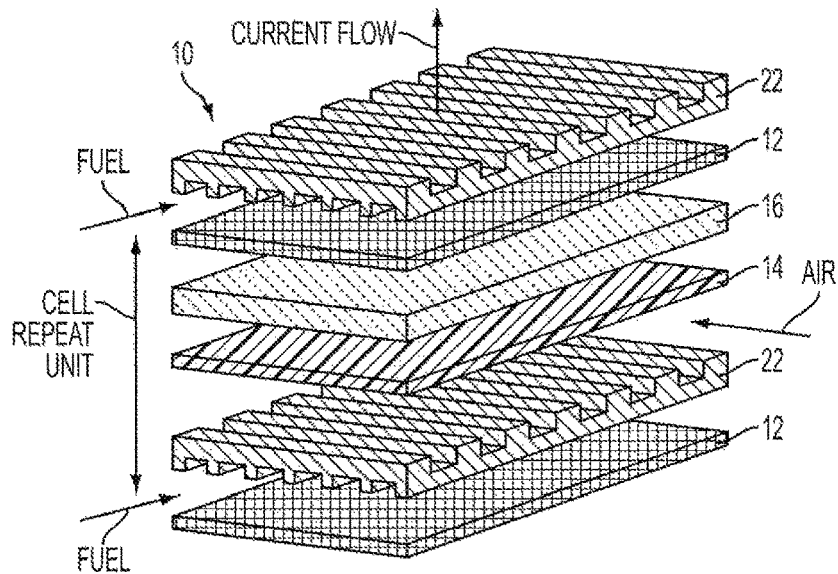
FIG. 1 is an exploded view of the components of a fuel cell.
Figure 2:
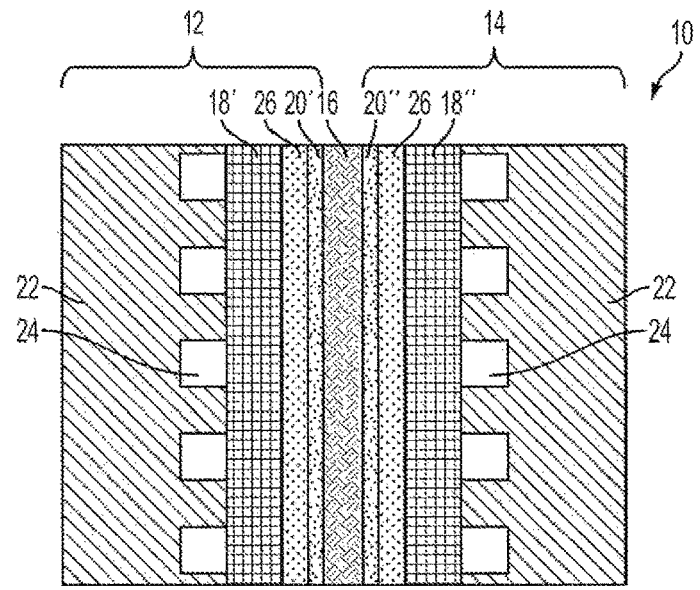
FIG. 2 is a schematic cross-section of a fuel cell.

With reference to FIGS. 1 and 2, an example of a PEMFC 10 is illustrated. The PEMFC 10 generally includes a negative electrode (anode) 12 and a positive electrode (cathode) 14, separated by a proton exchange membrane (PEM) 16 (also a polymer electrolyte membrane). The anode 12 and the cathode 14 may each include a gas diffusion layer (GDL) 18, a catalyst layer 20, and a bipolar or flow field plate 22 which forms a gas channel 24. The catalyst layer 20 may be the same for the anode 12 and the cathode 14, however, the anode 12 may have a catalyst layer 20' and the cathode 14 may have a different catalyst layer 20". The catalyst layer 20' may facilitate the splitting of hydrogen atoms into hydrogen ions and electrons while the catalyst layer 20" facilitates the reaction of oxygen gas and electrons to form water. In addition, the anode 12 and cathode 14 may each include a microporous layer (MPL) 26 disposed between the GDL 18 and the catalyst layer 20.

The PEM 16 may be any suitable PEM known in the art, such as a fluoropolymer, for example, Nafion (a sulfonated tetrafluoroethylene based fluoropolymer-copolymer). The GDL 18 may be formed of materials and by methods known in the art. For example, the GDL 18 may be formed from carbon fiber based paper and/or cloth. GDL materials are generally highly porous (having porosities of about 80%) to allow reactant gas transport to the catalyst layer (which generally has a thickness of about 10-15 μm), as well as liquid water transport from the catalyst layer. GDLs may be treated to be hydrophobic with a non-wetting polymer such as polytetrafluoroethylene (PTFE, commonly known by the trade name Teflon). An MPL may be coated to the GDL side facing the catalyst layer to assist mass transport. The MPL may be formed of materials and by methods known in the art, for example, carbon powder and a binder (e.g., PTFE particles). The catalyst layer 20 may include a noble metal or a noble metal alloy, such as platinum or a platinum alloy. The catalyst layer may include a catalyst support, which may support or have deposited thereon a catalyst material layer.

The bipolar plates 22 may have channels 24 defined therein for carrying gases. The channels 24 may carry air or fuel (e.g., hydrogen). As shown in FIG. 1, the plates 22 and channels 24 may be rotated 90 degrees relative to each other. Alternatively, the plates 22 and channels may be oriented in the same direction. Bipolar plate materials need to be electrically conductive and corrosion resistant under proton exchange membrane fuel cell (PEMFC) operating conditions to ensure that the bipolar plate perform its functions—feeding reactant gases to the membrane electrode assembly (MEA) and collecting current from the MEA.

Currently, carbon-based bipolar plates are the most commonly used. However, metal bipolar plates may offer several advantages over carbon-based plates. The use of metal may enable bipolar plates to be thinner, which may reduce the size of the fuel cell stack. In addition, it may enable the manufacturer to take advantage of high volume manufacturing processes, such as stamping, corrugated rolling, or others, which may reduce the cost of the fuel cell stack. Metal bipolar plates may have disadvantages, as well, however. One issue that affects metal bipolar plates is the leaching or elution of elements from the metal into the fuel cell during operation.

A metal that has been proposed for use in bipolar plates is stainless steel. Stainless steel is a low-cost, high strength, and readily available material. However, bare stainless steel alloys may form insulating passive layers under fuel cell operating conditions, resulting in higher surface electrical resistance. Therefore, to make stainless steel a practical substrate for bipolar plates, either corrosion resistant and electrically conductive coatings or particles must be applied to the stainless steel plate. A main obstacle to the use of stainless steel as the bi-polar plate is that the constituents of stainless steel substrate may slowly elute out through coating defects during fuel cell operation. One of the most common coating defects is pinholes, or small point-defects having a size of about several angstroms to tens of nanometers. The eluted metal ions (e.g., cations) may poison or contaminate the fuel cell stack components (such as the MEA). For example, some transition metal ions, such as ferric ions ($Fe^{+2}$ and $Fe^{+3}$), may react with hydrogen peroxide (a by-product of the oxygen reduction reaction (ORR)) in PEMFCs to form radicals, such as hydroxyl radicals (HO.) and/or perhydroxyl radicals (HOO.). Radicals may then chemically attack the membrane materials, which may affect the performance and/or longevity of the fuel cell. Iron is the main elemental component of stainless steel, therefore, elution of iron may be problematic. Examples of reactions with ferric ions to produce radicals are shown in reactions (1) and (2) below:

$$Fe^{+2}+H_2O_2 \rightarrow Fe^{+3}+HO.+OH^+ \quad (1)$$

$$Fe^{3+}+H_2O_2 \rightarrow Fe^{+2}+HOO.+H^+ \quad (2)$$

Several approaches have been taken to coat stainless steel (SS) bipolar plates in order to mitigate the elution of iron and other elements. One approach is to coat the SS plate with a layer of gold (Au). However, pinholes will almost always exist during film processing, requiring that the layer be relatively thick (e.g., at least 10 nm). Gold is expensive, therefore, using thicker layers is not desirable. In addition, gold is soft, so a 10 nm layer may be easily scratched during the assembly of the fuel cell, reducing or eliminating the effectiveness of the coating. Furthermore, it has been found that the gold layer may change its morphology during corrosion testing, forming spheres or globules. Another approach is to coat the SS plate with a layer of conductive metal oxide anchored with gold or iridium (Ir) nano-dots. However, the metal oxides are about 250 nm thick, which, when combined with the Au/Ir nano-dots, leads to reduced electrical conductivity.

Accordingly, there are still significant problems or hurdles to the use of metal bipolar plates, such as stainless steel plates. The present disclosure describes a metal bipolar plate including a coating having a radical scavenger, as well as methods for forming the coating. The disclosed coating may reduce or eliminate the number of radicals produced in the fuel cell due to elution. The disclosed coating may therefore allow metallic bipolar plates to be used, which may increase volumetric power density of the fuel cell stack, and may do so without an increase in cost.

Figure 3:
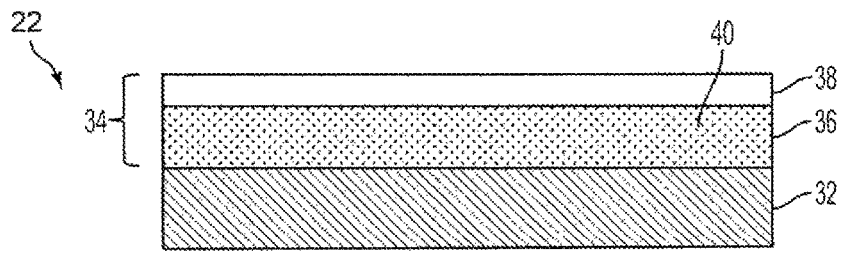
FIG. 3 is a schematic cross-section of a bipolar plate having a coating including a radical scavenger, according to an embodiment.

With reference to FIG. 3, a metal bipolar plate 22 is provided having a substrate 32 and a coating 34. The substrate may be metallic, such as steel, titanium, alloys thereof, or others. In one embodiment, the substrate 32 is formed of stainless steel, for example austenitic stainless steel (e.g., 301, 303, 304, 316 or 316L). Disposed over and contacting the substrate 32 is a middle layer 36 and disposed over and contacting the middle layer 36 is a conductive layer 38. Together, the middle layer 36 and the conductive layer 38 form the coating 34, which may be electrically conductive and corrosion resistant. The primary purposes of the middle layer 36 may be to improve adhesion between the conductive layer 38 and the substrate 32 and to reduce elution of ions from the substrate 32 into the fuel cell environment. The conductive layer 38 may primarily be an electrical conductor such that the bipolar plate 22 can collect current from the MEA within the fuel cell. The conductive layer 38 may also assist in preventing or reducing corrosion of or elution from the substrate 32.

The middle layer 36 may include any suitable electrically conductive bulk material that provides good adhesion to both the substrate 32 and the conductive layer 38. In one embodiment, the middle layer may include a carbide and/or nitride of chromium (Cr) and/or titanium (Ti). For example, CrN, $Cr_3C_2$, TiN, or TiC. The middle layer may include compositions that vary from the exact formulas above (e.g., 1:1 ratio of Cr and N). In one embodiment, the bulk material may include chromium and nitrogen in a Cr:N ratio of 0.7:1.3 to 1.3:0.7 (at %), or any sub-range therein. For example, the Cr:N ratio may be 0.8:1.2 to 1.2:0.8 or 0.9:1.1 to 1.1:0.9. The same ratios and ratio ranges may also apply to titanium and nitrogen (e.g., Ti:N) or titanium and carbon (e.g., Ti:C). In another embodiment, the bulk material may include chromium and nitrogen in a Cr:N ratio of 2.5:2.5 to 3.5:1.5 (at %), or any sub-range therein. For example, the Cr:N ratio may be 2.7:2.3 to 3.3:1.7 or 2.9:2.1 to 3.1:1.9. The middle layer may have any suitable thickness to provide good adhesion and/or good elution reduction. In one embodiment, the middle layer may have a thickness of 5 nm to 10 μm, or any sub-range therein. For example, the middle layer may have a thickness from 10 nm to 10 μm, 0.1 to 5 μm, 0.1 to 2 μm, 0.01 to 1 μm, 0.01 to 0.5 μm, 0.01 to 0.3 μm, or about 0.2 μm.

The conductive layer 38 may include any suitable electrically conductive material that is non-reactive with the components of the fuel cell. In one embodiment, the conductive layer 38 may include a form of conductive carbon, such as diamond-like carbon (DLC), graphite, graphene, carbon particles (e.g., carbon black), or others. Other suitable materials for the conductive layer may include noble metals, such as gold, iridium, ruthenium, tantalum, alloys or oxides thereof, or others. The conductive layer 38 may have any suitable thickness for providing sufficient conductivity to the coating 34. In one embodiment, the conductive layer 38 may have a thickness of a micron or less. For example, the conductive layer 38 may have a thickness of 1 to 500 nm, or any sub-range therein, such as 1 to 250 nm, 1 to 100 nm, 1 to 50 nm, 1 to 25 nm, 1 to 15 nm, 1 to 10 nm, 5 to 10 nm, or 1 to 5 nm.

As described above, eluted ions, such as ferric ions, may react with peroxide to form free radicals (referred to herein simply as "radicals"). The formed radicals may thereafter chemically react with the membrane materials in the fuel cell, which may reduce performance and the longevity or lifetime of the fuel cell. In order to eliminate or reduce the number of radicals that may be formed, a radical scavenging material or radical scavenger 40 may be included within the coating 34. The radical scavenger 40 may be included in the middle layer 36 and/or the conductive layer 38. The radical scavenger material may be included as an alloying element or composition, as a dopant or doping agent, or as an additional layer. The radical scavenging material may be a material that scavenges hydroxyl radicals (HO.) and/or perhydroxyl radicals (HOO.).

In one embodiment, the radical scavenging material 40 is cerium and/or a cerium oxide, $CeO_x$. The cerium may be metallic or pure cerium in any oxidation state (e.g., 0 to +4). The cerium oxide may be cerium(IV) oxide, $CeO_2$, or other forms of cerium oxide (e.g., cerium(III) oxide, $Ce_2O_3$). Cerium oxide is sometimes used as an electrolyte in solid oxide fuel cells (SOFCs), however, in the present disclosure they may be incorporated into the bipolar plate coating 34 to reduce radicals. Cerium oxide may decompose peroxide and scavenge radicals, for example, through the mechanism shown in reactions (3) to (7) below:

$$Ce^{+4}H_2O_2 \rightarrow Ce^{+3} + HOO^- + H^+ \quad (3)$$

$$Ce^{+4} + HOO. \rightarrow Ce^{+3} + O_2 + H^+ \quad (4)$$

$$Ce^{+3} + HOO. + H^+ \rightarrow Ce^{+3}H_2O_2 \quad (5)$$

$$CeO_x + HO. \rightarrow CeO_{x-1} + O_2 + H^+ \quad (6)$$

$$Ce^{+3} + HO. + H^+ \rightarrow H_2O + Ce^{+4} \quad (7)$$

As shown in the reactions above, the scavenging material 40 (e.g., cerium) may not be consumed during the radical scavenging reactions. Therefore, the radical scavenging material 40 may continue to scavenge radicals without being depleted, thereby increasing the lifetime of the material 40 and the fuel cell. In addition to, or instead of, cerium or cerium oxide, other radical scavenging materials 40 may also be used. In at least one embodiment, the radical scavenging material is an oxide of a rare earth metal or transition metals. A "transition metal" may be a metal in groups 3-12 of the periodic table. In one embodiment, the metal may possess adjacent oxidation states, for example, $M^{3+}$ and $M^{4+}$. Non-limiting examples of rare earth metals which may be used include terbium, europium and cerium. Non-limiting examples of transition metals which may be used include manganese, chromium, ruthenium, and vanadium.

The middle layer 36 may be applied or deposited using any suitable method known in the art, such as chemical or physical vapor deposition (CVD or PVD). Non-limiting examples of CVD processes that may be suitable include atmospheric, vacuum, aerosol assisted, plasma assisted, atomic layer CVD, wet chemical, CCVD, or others. Non-limiting examples of PVD processes that may be suitable include cathodic arc deposition, electron beam physical vapor deposition, evaporative deposition, pulsed laser deposition, sputter deposition (e.g., DC or RF magnetron sputtering), or others. The radical scavenging material 40 (e.g., cerium oxide) may be incorporated into the middle layer 36 using any suitable method, depending on the deposition technique used to form the middle layer 36. For example, in deposition techniques including multiple cathode or target materials, the radical scavenging material 40 (e.g., cerium oxide) may be added to the middle layer 36 during the deposition process. In one embodiment, the middle layer 36 may be deposited by sputtering (e.g., magnetron sputtering) and the radical scavenging material 40 (e.g., cerium or cerium oxide) may be co-sputtered onto the substrate 32 along with the middle layer material. The scavenging material may also be deposited in a reactive atmosphere (e.g., oxygen) to form an oxide (e.g., cerium oxide). The scavenging material may be deposited in any suitable oxidative state. For example, cerium may be deposited in any state from 0 to +4. The radical scavenging material 40 may be added using other doping techniques known in the art. For example, the radical scavenging material 40 (e.g., cerium or cerium oxide) may be diffused into the middle layer 36 from a gas, liquid, or solid. In one embodiment, separate layers of the middle layer material and the radical scavenging material may be deposited and then heat treated to diffuse into one another. The radical scavenging material 40 may also be added using ion implantation. Other methods, such as CVD epitaxy and other techniques used in, for example, semiconductor doping processes may also be used.

The radical scavenging material 40 may be present in the middle layer 36 in a quantity sufficient to scavenge all or substantially all of the iron ions that are present or produced. However, the scavenging material 40 may also be present at a quantity that does not substantially interfere with the properties of the middle layer 36, such as conductivity and adhesion. In at least one embodiment, the radical scavenging material comprises from 0.01 to 30 wt % of the middle layer 36, or any sub-range therein. For example, the radical scavenging material may comprise from 0.01 to 20 wt %, 0.1 to 20 wt %, 0.1 to 15 wt %, 1 to 15 wt %, 5 to 15 wt %, 8 to 12 wt %, 1 to 10 wt %, 0.01 to 10 wt %, 0.1 to 10 wt %, 0.1 to 5 wt %, or about 5 wt %, about 10 wt %, or about 15 wt % of the middle layer 36.

Accordingly, a metal bipolar plate (e.g., stainless steel) including a coating is provided. The coating may include a middle or intermediate layer covering and contacting the metal substrate and a conductive layer covering and contacting the middle layer. The middle layer may include a radical scavenging material, such as cerium or a cerium oxide, which may react with the radicals and other materials or chemical components within the fuel cell to neutralize the radicals before they attack the components of the fuel cell, such as the membranes. The radical scavenging material may not be consumed during the reaction, thereby allowing the reaction to be recursive and continue neutralizing radicals that may continue to form. The inclusion of the radical scavenging material in the coating may allow the use of steel (e.g., stainless steel) as the substrate for a bipolar plate in a fuel cell (e.g., PEMFC). Stainless steel is relatively cheap and easy to form and shape. It is also strong and can provide sufficient mechanical and electrical properties in very thin form factors. However, steel has previously been disfavored for bipolar plates due to the elution of iron ions that produce radicals within the fuel cell. Accordingly, by allowing the bipolar plate to be made of stainless steel, the disclosed coating may facilitate the formation of smaller, cheaper, and more robust fuel cells.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell bi polar plate, comprising:
    a steel substrate;
    a middle layer contacting the steel substrate, the middle layer formed of (i) a carbide or (ii) a nitride of chromium or titanium, and having a radical scavenging material comprising (I) pure cerium or $CeO_2$ diffused throughout and (II) terbium, europium, or manganese; and
    a conductive carbon layer overlaying and contacting the middle layer.

2. The bipolar plate of claim 1, wherein the conductive carbon layer includes a radical scavenging material comprising pure cerium or $CeO_2$.

3. The bipolar plate of claim 1, wherein the middle layer has a thickness ranging from 5 nm to 10 μm.

4. The bipolar plate of claim 1, wherein the radical scavenging material comprises 0.01 to 1 wt % or 10 to 30 wt % of the middle layer.

5. The bipolar plate of claim 3, wherein the conductive carbon layer has a thickness of 1 μm or less.

6. A proton exchange membrane fuel cell, comprising:
    a bipolar plate having:
    a steel substrate;
    a middle layer contacting the steel substrate and formed of (i) a carbide or (ii) a nitride of chromium or titanium, and having a radical scavenging material diffused throughout, the radical scavenging material including (I) cerium and (II) terbium, europium, or manganese the scavenge hydroxyl radicals or perhydroxyl radicals; and
    a conductive carbon layer overlaying and contacting the middle layer.

7. The proton exchange membrane fuel cell of claim 6, wherein the cerium includes pure cerium or $CeO_2$.

8. The proton exchange membrane fuel cell of claim 7, wherein the conductive carbon layer includes a radical scavenging material comprising pure cerium or $CeO_2$.

9. The proton exchange membrane fuel cell of claim 6, wherein the middle layer has a thickness ranging from 5 nm to 10 μm.

10. The proton exchange membrane fuel cell of claim 6, wherein the radical scavenging material comprises 0.01 to 1 wt % or 10 to 30 wt % of the middle layer.

11. A method of forming a radical scavenging coating on a proton exchange membrane fuel cell bipolar plate, comprising:
    applying a middle layer to a steel substrate, the middle layer formed of (i) a carbide or (ii) a nitride of chromium or titanium, and having a radical scavenging material diffused throughout that includes (I) cerium and (II) terbium, europium, or manganese; and
    applying a conductive carbon layer to the middle layer.

12. The method of claim 11, wherein the cerium is deposited as pure cerium or $CeO_2$.

13. The method of claim 11, wherein applying the middle layer to the steel substrate includes applying the carbide or nitride of chromium or titanium and the radical scavenging material such that the radical scavenging material comprises 0.01 to 1 wt % or 10 to 30 wt % of the middle layer.

14. The method of claim 11, wherein applying the middle layer to the steel substrate includes co-sputtering the carbide or nitride of chromium or titanium and the radical scavenging material.

15. The method of claim 11, wherein the middle layer is formed by first depositing the carbide or nitride of chromium or titanium and then diffusing the radical scavenging material into the nitride of chromium or titanium.

16. The method of claim 11, wherein the middle layer is formed by depositing a layer of carbide or a layer of nitride of chromium or titanium, and a separate layer of the radical scavenging material and then diffusing the layers together using a heat treatment.

17. The method of claim 11, wherein applying the conductive carbon layer includes applying a conductive carbon layer including a radical scavenging material comprising pure cerium or $CeO_2$.

18. The proton exchange membrane fuel cell of claim 9, wherein the conductive carbon layer has a thickness of 1 μm or less.

* * * * *